United States Patent [19]

Horn

[11] 4,229,280
[45] Oct. 21, 1980

[54] PROCESS FOR ELECTRODIALYTICALLY CONTROLLING THE ALKALI METAL IONS IN A METAL PLATING PROCESS

[75] Inventor: Richard E. Horn, Pittsburgh, Pa.

[73] Assignee: Pitt Metals & Chemicals, Inc., Pittsburgh, Pa.

[21] Appl. No.: 896,058

[22] Filed: Apr. 13, 1978

Related U.S. Application Data

[60] Division of Ser. No. 716,225, Aug. 20, 1976, Pat. No. 4,111,772, which is a continuation-in-part of Ser. No. 579,947, May 22, 1975, abandoned.

[51] Int. Cl.² .................. B01D 13/02; C25C 1/14
[52] U.S. Cl. .................. 204/301; 204/130; 204/180 P
[58] Field of Search .................. 204/54 R, 120, 180 P, 204/301

[56] References Cited

U.S. PATENT DOCUMENTS

| | | | |
|---|---|---|---|
| 3,347,761 | 10/1967 | Bicek | 204/120 X |
| 3,444,066 | 5/1969 | Brewer et al. | 204/181 C |
| 3,671,412 | 6/1972 | Lohr | 204/301 X |
| 3,682,806 | 8/1972 | Kinsella et al. | 204/181 C |
| 3,764,503 | 10/1973 | Lancy et al. | 204/301 X |
| 3,945,900 | 3/1976 | Klinkowski | 204/299 EC X |
| 3,962,059 | 6/1976 | Kaup et al. | 204/299 EC X |
| 4,024,046 | 5/1977 | Lupinski et al. | 204/299 EC X |

*Primary Examiner*—Arthur C. Prescott
*Attorney, Agent, or Firm*—Stanley J. Price, Jr.; John M. Adams

[57] ABSTRACT

In one specie a tin-plating bath contains an alkali metal stannate and generates an alkali metal hydroxide during the electrodeposition of tin. The tin-plating bath is circulated through the anode compartment of an electrodialytic cell that has a cation permselective membrane separating the anode compartment from the cathode compartment. The cathode compartment contains a suitable electrolyte and when a current is impressed across the electrodialytic cell, the alkali metal ions in the plating bath migrate through the permselective membrane into the cathode compartment and the stannate ions remain in the tin-plating bath in the anode compartment. The removal of the alkali metal ions from the tin-plating bath controls the alkali metal hydroxide content of the plating bath. The electrodialytic cell may be positioned in the tin plating bath and where feasible utilize the same power source as the plating bath. Where bath drag out is excessive and the amount of alkali metal hydroxide removed from the plating bath reduces the amount of treatment of the plating bath, the alkali metal stannate is recovered from the rinse water by passing the rinse water through a center compartment of a three compartment electrodialytic cell bounded by a cation and an anion or neutral permselective membrane. The stannate ions in the rinse water migrate to the anode compartment and are returned to the plating bath and the potassium ions pass to the cathode compartment. In an acid bath containing a tin fluoride complex with a fluostannite ion the excess alkali metal ions are removed from either the plating bath or the rinse water by passing the bath or rinse water through the center compartment of a three compartment electrodialytic cell that is bounded on both sides by a cationic permselective membrane. The cathode compartment contains an alkali metal hydroxide and the anode compartment contains an acid and an insoluble anode. The alkali metal ions are transferred from the center compartment to the cathode compartment thus removing the excess alkali metal ions from the bath and rinse water.

6 Claims, 7 Drawing Figures

PROCESS FOR ELECTRODIALYTICALLY CONTROLLING THE ALKALI METAL IONS IN A METAL PLATING PROCESS

CROSS REFERENCES TO RELATED APPLICATIONS

This application is a division of copending application Ser. No. 716,255 filed on Aug. 20, 1976, now U.S. Pat. No. 4,111,772 entiled "Process For Electrodialytically Controlling The Alkali Metal Ions In A Tin Plating Process", which in turn is a continuation-in-part of application Ser. No. 579,947 filed on May 22, 1975, and entitled "A Process For Controlling Alkali metal Hydroxide In An Alkali Metal Stannate Tin-Plating Bath", now abandoned.

BACKGROUND OF THE INVENTION

1. Field of the Invention

This invention relates to a process for electrodialytically controlling the alkali metal ions in a metal plating process and more particularly to a process for controlling the alkali metal hydroxide in a tin-plating bath, the rinse water or both.

2. Description of the Prior Art

Alkali metal stannate tin plating, using potassium or sodium stannate is a commercial method of plating tin to base metal substrates. Conventionally this process has been carried out using soluble tin anodes. The use of tin anodes causes a substantial number of control problems. If the anode current density is too low, the tin dissolves in the form of stannite or stannous tin which causes rough, poorly adhering plate. If the anode current density is too high, an insoluble film forms on the surface of the anodes and the tin does not dissolve. These problems require accurate control of the anode current density which will vary as the soluble tin anodes are consumed. This in turn limits the range of current density useable in alkali metal stannate.

An alternative to using soluble anodes is to use insoluble anodes. As there is no dissolution of the anode material, the allowable current densities are much greater and more flexible. However, plating from the solution causes the generation of two moles of alkali metal hydroxide for each mole of stannate consumed.

$$K_2Sn(OH)_6 \rightarrow 2KOH + Sn + 2H_2O + O_2$$

This accumulation of alkali metal hydroxide must be periodically removed from the bath. One possible method is to neutralize the alkali metal hydroxide with acid. However, neutralization with acid causes other problems. The byproduct of acid neutralization with, for example, acetic acid, is an alkali metal acetate which is an extremely soluble compound and accumulates in the plating bath. When the accumulation becomes too great, the common ion effect causes a drastic decrease in the solubility of the stannate and the bath must be discarded. Another possible alternative is to use alpha oxide sols of tin as a replacement for the stannate. Sols are disclosed in U.S. Pat. Nos. 3,346,468; 3,723,273 and 3,455,794.

The use of the alpha oxide sols while operable will only work in potassium stannate solutions and will not work in sodium stannate solutions. The alpha oxide sols have a limited shelf life and are very expensive. In addition, with the use of tin sols it is necessary to maintain a high level of free alkali, that is, from five to ten ounces per gallon. This causes difficulties in a stannate bath when the substrate is an active metal as, for example, aluminum. There is a need for a process to plate tin electrolytically utilizing insoluble anodes and preventing the accumulation of alkali metal hydroxide in the plating bath.

Where the drag out from the plating bath is excessive, there is a substantial loss of the valuable potassium stannate from the plating bath. There is a need for a process to economically recover the potassium stannate and return it to the plating bath.

In a halogen acid plating bath, oxidation caused by air introduced into the bath results in a loss of tin and fluoride compounds, the formation of sodium hydroxide and an increase in the pH of the bath. Additives to maintain the pH at desirable levels increases the dissolved solids and reduces the plating efficiency. There is a need for a process to control the pH and the alkali metal ions in a tin plating bath, the rinse water or both.

SUMMARY OF THE INVENTION

This invention relates to a process for controlling the metal ions in an electrochemical metel-plating process where a solution containing an excess of alkali metal ions and a metal compound is withdrawn from the plating bath tank, the rinse tank or from both tanks and introduced into an electrodialytic cell. In the cell a portion of the alkali metal ions that are in excess of the alkali metal ions necessary to maintain the metal compound in solution are removed from the solution and the solution with the alkali metal ions removed therefrom is returned to the plating process.

In one specie directed to a process for controlling alkali metal hydroxide in a tin-plating bath, tin is deposited electrolytically from an aqueous tin-plating bath containing an alkali metal stannate and an alkali metal hydroxide is generated in the plating bath. A portion of the bath containing the alkali metal hydroxide and alkali metal stannate is removed from the bath and introduced as an anolyte into the anode compartment of an electrodialytic cell. A portion of the alkali metal ions in excess of that necessary to maintain the tin in solution as an alkali metal stannate is removed from the anolyte while the concentration of alkali metal ions in the anolyte is maintained at a level so that the concentration of the alkali metal stannate remains substantially the same. The treated portion of the bath from the anode compartment having the alkali metal hydroxide removed therefrom is returned to the plating bath in the plating tank.

Apparatus for practicing the above process may include an electrodialytic cell within the plating tank. In one embodiment, two sides of the tank form two sides of the cell and one or both of the other sides of the cell may be formed from the cation permselective membrane. In another embodiment, at least one of the walls of the cathode compartment of the cell comprises a cation permselective membrane which is spaced from the other wall by a separator and a cathode is positioned in the cathode compartment. The cathode compartment is suspended in the tank and has an anode positioned adjacent the cation permselective membrane. Water is introduced into the cathode compartment of the cell and the alkali metal hydroxide is removed therefrom. The anode for the cell may be either the anode for the plating bath or a separate anode positioned adjacent the permselective membrane. The cathode is positioned within the cathode compartment of the cell and where feasible the power source for the electrochemical deposition may also be used for the electrodialytic separation of the alkali metal hydroxide.

The alkali metal stannate may be recovered from the rinse water containing both alkali metal stannate and an alkali metal hydroxide by introducing a portion of the rinse water into the center compartment of a three compartment electrodialytic cell. The cell center compartment is separated from the anode compartment by an anion permselective membrane or a neutral membrane and separated from the cathode compartment by a cation permselective membrane. The anode compartment contains an alkali metal hydroxide or the plating solution. The stannate ions in the rinse water introduced into the center compartment pass through the anion permselective or neutral membrane and react with the alkali metal hydroxide or the plating solution containing excess alkali metal hydroxide in the anode compartment to form an alkali metal stannate which is returned to the plating bath. The rinse water after removal of the stannate ions may be further treated and returned to the rinse tank.

A process for controlling the alkali metal ions in an electrochemical halogen tin-plating process using an acid plating bath includes withdrawing from the tin-plating process a solution containing an excess of alkali metal ions and a tin halogen complex. The solution is introduced into the center compartment of a three compartment electrodialytic cell. The center compartment is separated from the anode compartment and the cathode compartment by cation permselective membranes. An acid is supplied to the anode compartment and an alkali metal hydroxide is supplied to the cathode compartment. The alkali metal ions in the solution introduced into the center compartment pass through the permselective membrane into the cathode compartment of the cell and hydrogen ions pass through the permselective membrane from the anode compartment into the cell center compartment. The solution with the excess alkali metal ions removed therefrom is then introduced into the plating tank.

The primary object of this invention is to remove excess alkali metal ions from a solution obtained during the electrochemical plating of a metal and returning the metal compounds to the plating process.

Another object of this invention is to recover the tin compounds from the water used to rinse the tin-plated material.

A still further object of this invention is to control the pH of an acid tin-plating bath by controlling the alkali metal ions in the bath.

These and other objects and advantages of this invention will be more completely disclosed and described in the following specification, the accompanying drawings and the appended claims.

DESCRIPTION OF THE PREFERRED EMBODIMENTS

Figure 1:
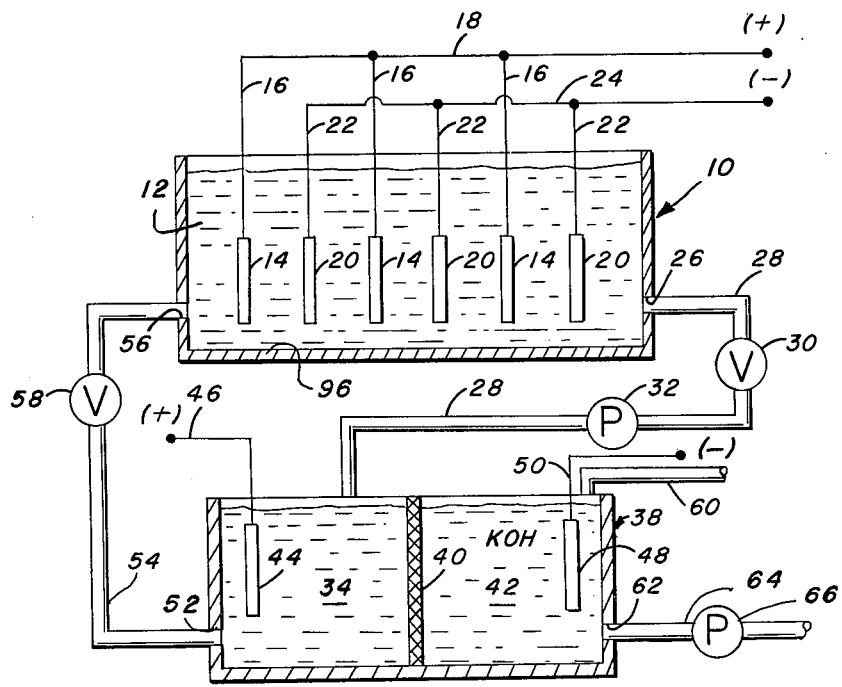
FIG. 1 is a flow diagram illustrating the tin-plating tank and the electrodialytic cell with the tin-plating bath circulating from the tin-plating tank through the anode compartment of an electrodialytic cell and back to the tin-plating tank.

Referring to FIG. 1, there is illustrated a tin-plating tank generally designated by the numeral 10 that has an aqueous tin-plating bath or tin-plating solution 12 that includes either an aqueous solution of potassium or sodium stannate. Positioned within the tin-plating bath are a plurality of insoluble anodes 14 which are connected by wires 16 to a common wire 18. Also positioned within the tank are a plurality of cathodes 20 that are connected by wires 22 to a common wire 24. The wires 18 and 24 are connected to the positive and negative terminals of a source of current which when energized impresses a current between the anodes 14 and cathodes 20 to plate tin on objects positioned within the tin-plating bath 12. The insoluble anodes 14 may be fabricated from stainless steel or the like.

The tank 10 has an outlet opening 26 and conduit 28 is connected thereto. The conduit 28 has a valve 30 therein to control the flow of the tin-plating bath therethrough. A pump 32 is also connected to the conduit 28 and is arranged to controllably withdraw plating solution from the bath 12 and conduct the plating solution to the anode compartment 34 of an electrodialytic cell generally designated by the numeral 38.

The electrodialytic cell 38 includes a cation permselective membrane 40 dividing the cell 38 into an anode compartment 34 and a cathode compartment 42. Insoluble anode 44 is positioned in the anode compartment 34 and is connected to a wire 46. The wire 46 is connected at the other end of the positive terminal of a source of current. The cathode compartment 42 has an insoluble cathode 48 positioned therein. The insoluble cathode 48 has a wire 50 connected thereto with the other end of wire 50 connected to a negative terminal of the same source of current.

The electrodialytic cell 38 has an outlet opening 52 in the anode compartment 34 to which is connected a conduit 54. The plating tank 10 has an inlet opening 56 opposite the outlet opening 26 and conduit 54 is connected to opening 56. A valve 58 is positioned in conduit 54 to control the flow of plating bath solution therethrough. With this arrangement the plating bath solution is circulated from the plating tank 10 through conduit 28 to the anode compartment 34 of the electrodialytic cell 38. The plating solution is further circulated from the anode compartment 34 through the conduit 54 back to the plating tank 10. With this arrangement the plating bath solution may be continuously or intermittently circulated from the plating tank 10 through the anode compartment of the electrodialytic cell 38 and back to the plating tank 10.

The electrodialytic cell 38 has a conduit 60 arranged to supply an electrolyte such as acid or water to the cathode compartment 42. The cell 38 has an outlet opening 62 to which a conduit 64 is connected to withdraw liquid from the cathode compartment 42 at a controlled rate. A pump 66 is provided in conduit 64 to control the flow of fluid from the cathode compartment 42. With this arrangement the electrolyte within the cathode compartment 42 may be replaced either continuously at a controlled rate or intermittently depending upon the concentration of the alkali metal hydroxide in the cathode compartment.

Although only a two compartment cell is illustrated it should be understood that other cell arrangements that include cation permselective membranes may also be utilized. The anode 44 and cathode 48 are insoluble anodes and cathodes and are fabricated preferably from stainless steel. Other metals may be used which are insoluble in the plating bath.

With this arrangement the plating solution conveyed to the anode compartment 34 contains an alkali metal hydroxide. When a current is impressed across the electrodialytic cell the sodium or potassium ions migrate through the cation permselective membrane 40 into the cathode compartment 42 of the electrodialytic cell 38 thus reducing the amount of alkali metal hydroxide present in the plating solution. The solution with the reduced amount of alkali metal hydroxide is then recycled through conduit 54 to the plating tank 10. As previously stated the recirculation may be continuous or intermittent.

The stannate ions contained in the plating solution will not migrate through the permselective membrane 40 so that only the excess alkali metal is removed from the plating bath. By regulating the current across the electrodialytic cell the free alkali metal in the plating bath may be accurately controlled. Although the following example utilized potassium stannate, it should be understood that either potassium stannate or sodium stannate may be used in the tin-plating bath.

EXAMPLE

A typical electroplating bath utilizing potassium stannate was prepared containing 1600 mls. of solution. The solution comprised 150 g/l of potassium stannate and 23 g/l excess potassium hydroxide. The bath was operated for a period of nine hours during which time all the tin units were replenished by the addition of potassium stannate. The plating bath was continuously conducted through the anode compartment of an electrodialytic cell containing a stainless steel anode. The anode compartment was separated from the cathode compartment by a cation permselective membrane manufactured by the Ionac Chemical Company and designated "MC-3470". The following tables show that the free alkali metal concentration in the plating bath was kept essentially constant.

| | Plating Bath | | | | |
|---|---|---|---|---|---|
| Time, Hrs. | Solution Tin Concentration, gm/l. | Tin Plated, gms. | % Eff | Free KOH Concentration, gm/l. | KOH Generated, gms. |
| Initial | 56.00 | — | — | 23.00 | — |
| 1 | 49.54 | 10.34 | 94.0 | 22.63 | 9.81 |
| 3 | 36.65 | 30.96 | 93.8 | 21.80 | 29.38 |
| Tin addition adjustment | 54.00 | | | 22.54 | |
| 4 | 47.56 | 41.26 | 93.7 | 22.18 | 39.16 |
| 6 | 34.21 | 62.62 | 93.6 | 22.12 | 59.44 |
| Tin addition adjustment | 55.50 | | | 23.08 | |
| 7 | 49.06 | 72.93 | 93.8 | 22.68 | 69.22 |
| 9 | 36.18 | 93.53 | 93.7 | 21.93 | 88.77 |

| | Electrodialytic Cell | | |
|---|---|---|---|
| Time Hrs. | KOH Concentration | KOH Passing Membrane | % Eff |
| 0 | 26.32 | — | — |
| 1 | 36.51 | 10.18 | 97.55 |
| 3 | 56.91 | 30.58 | 97.63 |
| 4 | 67.05 | 40.72 | 97.08 |
| 6 | 87.39 | 61.06 | 97.38 |
| 7 | 97.57 | 71.24 | 97.55 |
| 9 | 117.87 | 91,54 | 97.40 |

The plating bath was maintained at a temperature of about 150° F. and 0.373 faraday of current at 3.4 volts and 10 amps was impressed across the plating bath. The electrodialytic cell was subjected to 0.1865 faraday of current at 3 volts and 5 amps. The temperature of the solution in the electrodialytic cell was about 120° F.

The table setting forth the condition of the plating bath during a nine-hour run clearly shows the tin solution concentration and the grams of tin plated with the percent efficiency in plating. The column in this table indicating the free potassium hydroxide concentration shows the 23 g/l excess potassium hydroxide in the bath initially and the fact that the free potassium hydroxide concentration remained substantially the same in the plating bath over the nine-hour run. The next column shows the potassium hydroxide generated over the nine-hour run which was approximately 88.77 grams.

Referring to the table for the electrodialytic cell, the concentration of the potassium hydroxide in the cathode compartment is set forth in the first column. The concentration increased over the nine-hour run to include the potassium hydroxide generated in the plating bath over the same nine-hour run. The second column shows the amount of potassium ions that passed through the cation permselective membrane and formed potassium hydroxide in the cathode compartment. The efficiency of the electrodialytic cell is set forth in the next column.

In the above example, the electrolyte solution in the cathode compartment 42 was an aqueous solution of potassium hydroxide that had a potassium hydroxide concentration slightly higher than the potassium hydroxide concentration in the plating bath at the beginning of the nine-hour run. If an acid solution were employed as the electrolyte the potassium ions would form a potassium salt in the cathode compartment 42.

Figure 2:
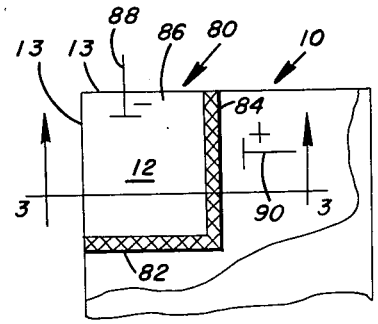
FIG. 2 is a schematic fragmentary top plan view of a corner of the tin-plating tank with the cathode compartment of an electrodialytic cell positioned therein.
Figure 2A:
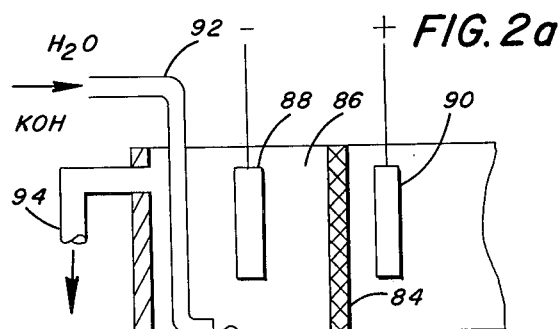
FIG. 2a is a view in section taken along the lines 3—3 illustrating in elevation the tin-plating tank with the cathode compartment of the electrodialytic cell positioned therein.

Referring to FIGS. 2 and 2a, there is diagrammatically illustrated one embodiment of an electrodialytic cell similar to the electrodialytic cell 38 discussed with reference to the process illustrated in FIG. 1. In FIG. 2, the electrodialytic cell is within the plating tank 10 and the side walls 13 of plating tank 10 form two walls of the electrodialytic cell generally designated by the numeral 80. The other two walls 82 and 84 of the cathode compartment of the electrodialytic cell 80 are formed of interconnected cation permselective membranes. Thus, by simply positioning two permselective membranes 82 and 84 within the plating tank 10 and connecting the permselective membranes to the side walls and floor or bottom wall 96 of the tank 10 a cathode compartment or chamber 86 is formed within the tank 10. The cathode 88 is diagrammatically illustrated in FIG. 2 and is illustrated in FIG. 2a as a metal cathode 88 suitably supported within the chamber 86 in a manner similar to the cathode 48 illustrated in FIG. 1. In FIG. 2 the anode 90 is diagrammatically illustrated and in FIG. 2a is illustrated as an insoluble metallic anode positioned adjacent the permselective membrane 84. The anode 90 is similar to the anode 44 illustrated in FIG. 1. Thus, the plating tank 10 forms the anode compartment of the cell 80 and the cathode compartment 86 is formed by the side walls and bottom wall of the plating tank and the two cation permselective membranes.

Both the cathode 88 and anode 90 are connected to a suitable source of power which may be the same power utilized in the electrochemical plating process. A conduit 92 is arranged to supply water to the lower portion of chamber 86 and an overflow pipe 94 is arranged to withdraw the alkali metal hydroxide formed within the chamber 86.

Figure 3:
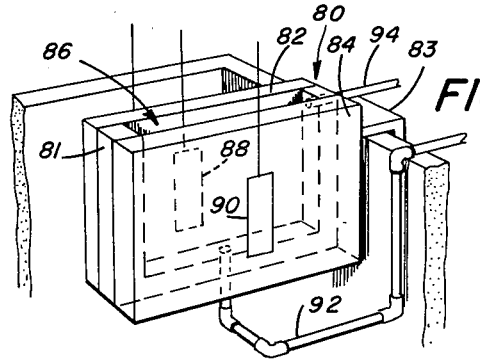
FIG. 3 is a schematic fragmentary perspective view of the cathode compartment of an electrodialytic cell suspended in a plating tank.
Figure 3A:
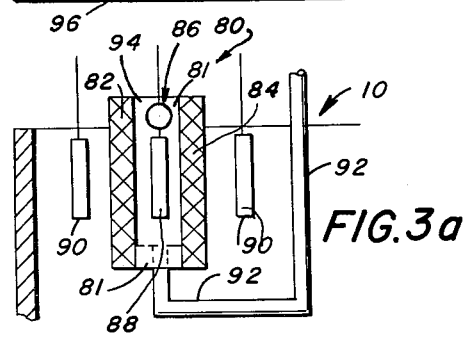
FIG. 3a is a view in section of the cathode compartment of the electrodialytic cell illustrated in FIG. 3.

Another embodiment is illustrated in FIGS. 3 and 3a and similar numerals will indicate similar parts. The electrodialytic cell 80 includes a cathode compartment 86 having side walls formed by a pair of cation permselective membranes 82 and 84 positioned in spaced relation to each other. A U-shaped spacer 81 is positioned between the membrane walls 82 and 84 and has an opening in the base for a water inlet conduit 92 and an opening in an upwardly extending portion for the outlet 94. A hook shaped portion 83 is provided to hang the cathode compartment 86 in the plating tank 10. A cathode 88 is suitably suspended in the cathode compartment 86 and anodes 90 are suitably suspended adjacent the cation membrane walls 82 and 84.

It should be understood that other modifications of an electrodialytic cell including the plating tank may be made such as positioning a three sided cell along the side of the tank and forming a rectangular opening in the side of the tank. A cation permselective membrane positioned in the opening forms the other wall of the cell and when a current is impressed across the anode and cathode the alkali metal ions migrate from the tank through the permselective membrane into the auxiliary tank-like electrodialytic cell mounted on the side of the plating tank. With this arrangement the tank functions as the anode compartment of the cell and the cathode compartment of the cell are positioned externally of the tank.

Figure 4:
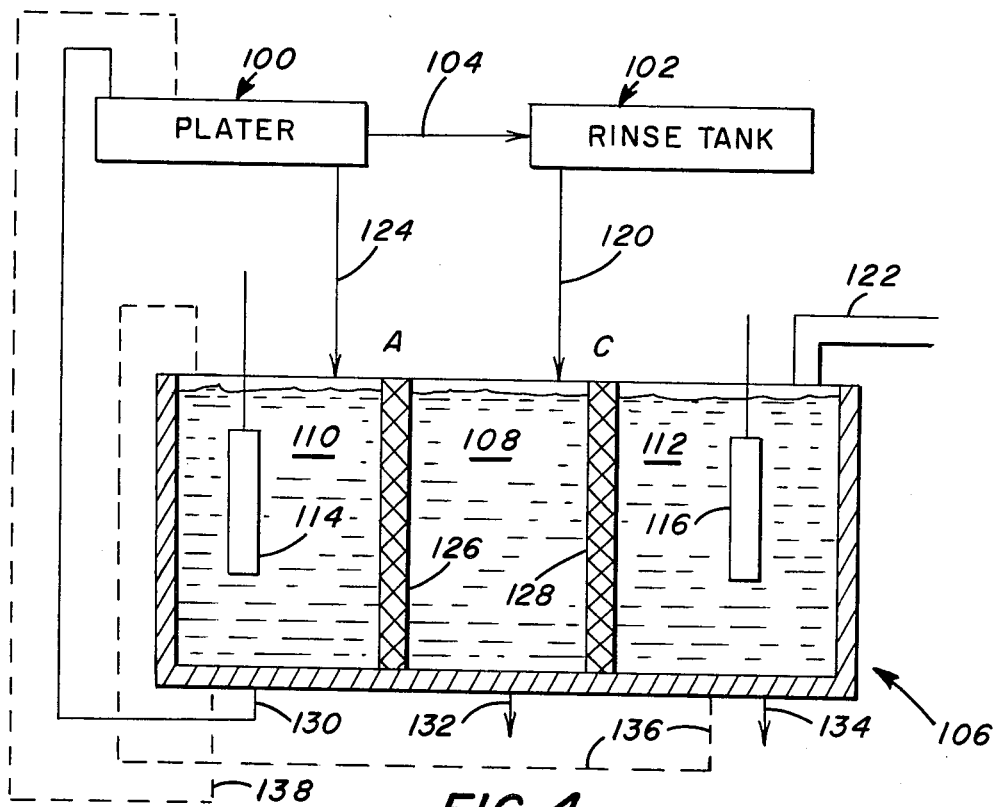
FIG. 4 is a flow diagram illustrating the tin-plating tank, the rinse water tank and the three compartment electrodialytic cell. The circulation of the rinse water to the center compartment and the recovery of the stannate compound therefrom is illustrated diagrammatically.

Referring to FIG. 4 there is diagrammatically illustrated a plating tank and a rinse tank. The plating tank holds the aqueous plating bath and the electrochemical plating process takes place within the plating tank. The material plated is then transferred to a rinse tank where the material is thoroughly rinsed with water. Where elongated metal strips are plated the metal strips pass through the plating tank and then into the rinse tank. A substantial amount of the aqueous tin-plating bath is transferred from the plating tank to the rinse tank by the rapidly moving metal strips. This loss of the plating bath is commonly referred to as a "drag out" of the plating bath.

When the drag out is excessive, the alkali metal hydroxide removed from the plating tank reduces the amount of treatment required by the process previously described and illustrated in FIG. 1 to control the alkali metal hydroxide in the plating bath. In an extreme situation, the drag out may be so large that there is little if any increase in alkali metal hydroxide beyond a certain point such as 10 oz/gal. This concentration of alkali metal hydroxide may be acceptable for certain plating operations. Although the plating quality with the high drag out may be acceptable, there is an extremely high loss of valuable potassium stannate in the drag out and the possibility of corrosion problems and safety problems from the high caustic levels in the rinse water. The rinse water could be concentrated by conventional methods to recover a concentrated solution of tin compounds and the alkali metal hydroxide. This, however, is expensive and would then result in excessive alkali metal hydroxide in the plating bath if the concentrated solution were returned to the plating tank.

As illustrated in FIG. 4, the plating tank is generally designated by the numeral 100 and the rinse tank by the numeral 102. The transfer of the plating bath to the rinse tank is indicated diagrammatically by the line 104 and designated drag out. The process for recovering the tin units from the rinse water includes an electrodialytic cell 106 that has a center compartment 108, an anode compartment 110 and a cathode compartment 112. The anode compartment 110 has an anode 114 suspended in a manner similar to the anode 44 illustrated in FIG. 1. The cathode 116 in cathode compartment 112 is also suspended in a manner similar to the cathode 48 illustrated in FIG. 1.

A conduit 120 is arranged to convey rinse water containing potassium stannate and potassium hydroxide from the tank 102 to the electrodialytic cell center compartment 108. Water is introduced into the cathode compartment 2 and the tin-plating bath which includes both the potassium stannate and potassium hydroxide in solution is withdrawn from the plating tank 100 and introduced into the cell anode compartment 110 through conduit 124.

When a current is impressed across the anode and cathode of the cell 106 the stannate ions in the rinse water in the center compartment 108 migrate through the anion permselective membrane or neutral membrane 126 into the anode compartment 112. In the anode compartment 112 the stannate ions react with the alkali metal hydroxide in the plating bath introduced into the anode compartment 110 through conduit 124 and form potassium stannate. The plating bath enriched in potassium stannate and reduced in potassium hydroxide is withdrawn from the anode compartment 110 through outlet conduit 130 and returned to the plating bath in the plating tank 100. The rinse water is withdrawn from the center compartment 108 through conduit 132 and the water introduced into the cathode compartment 112 is withdrawn through conduit 134. The rinse water and the water from cathode compartment 112 contain potassium hydroxide and may be neutralized for reuse or may be discarded.

The potassium ions that migrate from the cell center compartment 108 to the cathode compartment form an alkali hydroxide solution in the cathode compartment 112.

In another embodiment illustrated in FIG. 4 by dotted lines the water introduced into the cathode compartment 112 is withdrawn therefrom through conduit 136 as an alkali hydroxide solution and introduced into the anode compartment 110. This eliminates recycling the plating bath and the alkali metal hydroxide in the solution introduced through conduit 136 from the cathode compartment 112 reacts with the stannate ion in the anode compartment 110 to form potassium stannate. The potassium stannate is withdrawn through conduit 138 and introduced as a part of the plating bath.

With the above process it is apparent that it is now possible to recover the tin units in the rinse water by the migration of the stannate ions from the rinse water in the electrodialytic cell center compartment 108 to the anode compartment 110. The plating bath in this embodiment has substantially the same composition as the plating bath described with reference to the process illustrated in FIG. 1. The permselective membranes suitable for use in the electrodialytic cell 106 may be purchased from the same source as the permselective membrane illustrated in FIG. 1.

Figure 5:
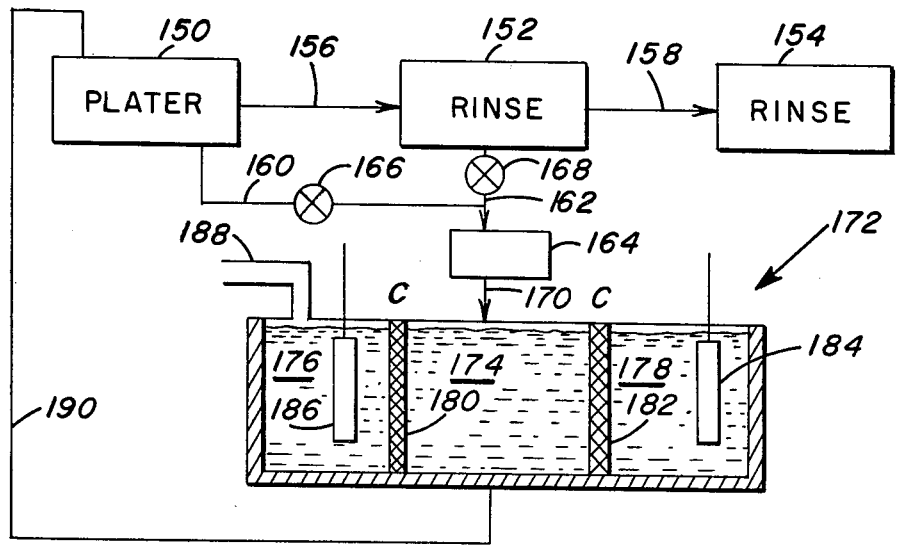
FIG. 5 is a flow diagram illustrating a tin-plating tank, a reclaim rinse tank and a three compartment electrodialytic cell. The circulation of the solution from either the plating tank or rinse tank to the center compartment of the cell and the recycle of the tin compounds to the plating tank is diagrammatically illustrated.

Referring to FIG. 5, there is illustrated diagrammatically, a tin-plating process in which the material to be plated is electrochemically plated in the aqueous plating bath in a plating tank 150. The material after plating is transported to a first rinse tank 152 where the plated material is rinsed with water. Subsequent to the first rinse, the material is transported to a second rinse tank 154 where the material is again rinsed with water. The transfer of the material from the plating tank 150 to the first rinse tank 152 is indicated by the line 156 and the transfer of the material from the first rinse tank 152 to the second rinse tank 154 is indicated by the line 158. Where strip steel is being plated it passes at high velocity from the plating bath 150 to the rinse tanks, and a substantial amount of the tin units are lost by drag out and where a halogen plating bath is used, the halogen tin complex is oxidized and precipates in the bath and rinse water.

A typical halogen electrotinning bath is disclosed in U.S. Pat. No. 3,907,653 assigned to the same Assignee and entitled "Process For Recovering Tin Salts From A Halogen Tin Plate Sludge". The disclosure of U.S. Pat. No. 3,907,653 is incorporated herein by reference. The bath contains a tin fluoride complex with a fluostannite ion. The fluoride complex in the bath is stable and does not precipate the basic tin salts where the pH of the bath is within the range of 2.5 and 4.0.

During the tin-plating of strip steel, the strip very rapidly moves through the bath and air is introduced into the bath by the rapid movement of the strip steel and agitation from other sources. The air introduced into the bath oxidizes a portion of the tin fluoride complex. The oxidized tin is in the form of a stable anionic complex and has the formulation $Na_2SnF_6$. The oxidized tin compound does not have any adverse effects on the bath but, because of its low solubility, precipitates and settles to the bottom of the bath in a crystalline mass. Sodium ferrocyanide is also added to the bath and reacts with the iron drawn in with the rapidly moving strip of sheet steel to form an iron ferrocyanide compound.

The oxidation process results in a loss of tin and fluoride compounds and increases the pH of the bath due to the formation of sodium hydroxide. The loss of tin due to oxidation does not change the fluoride to tin mol ratio which is desirable to maintain at about 6 and 7 to 1. The increase in pH however, requires the addition of sodium bifluoride (NaF.HF) or hydrochloric acid to maintain the pH at the desired level of between about 2.5 and 4.0.

There has been a tendency in plating operations to install countercurrent rinsing after the plating bath with the solution from the last stage of the countercurrent rinsing being returned to the plating bath proper. The net result is that there is a general increase of total dissolved solids in the plating bath. Such an increase in dissolved solids creates a need for a means of reducing the pH in the halogen tin-plating bath without increasing the total dissolved solids. If the formation or amount of sodium hydroxide or alkali metal hydroxide in the bath is controlled the pH will also be controlled and can be maintained at the desired level.

The process illustrated in FIG. 5 provides a means for controlling the pH of a halogen tin plating bath by withdrawing the plating solution through conduit 160 or the rinse water through conduit 162 and introducing the solution from conduit 160 or 162 into a filter 164. Valves 166 and 168 are provided to control the flow to the filter 164 from either the plating bath in tank 150 or the rinse water tank 152. After the solution has been filtered in filter 164 it may be further treated to remove organic impurities by suitable means and is thereafter introduced through conduit 170 to an electrodialytic cell 172 that has a center compartment 174 and an anode compartment 176 and cathode compartment 178. The center compartment 174 is separated from the anode compartment 176 by a cation permselective membrane 180 and the center compartment is separated from the cathode compartment by a similar cation permselective membrane 182. The cathode compartment contains an aqueous solution of an alkali metal hydroxide and a conventional cathode 184. The anode compartment contains an acid and an insoluble anode 186. Conduit 188 is provided to supply make-up acid to the anode compartment 176.

When a current is impressed across the cell the alkali metal ions in the solution in the center compartment 174 migrate through the permselective membrane 182 to the cathode compartment 178 and hydrogen ions are passed from the anode compartment 176 and the solution withdrawn from the center compartment 174 through conduit 190 has a reduced concentration of alkali metal ions. The solution withdrawn from the center compartment 174 is fed through conduit 190 into the plating tank 150.

In this manner, excess alkali metal ions in the plating bath are removed. The tin in solution which is in the form of either a fluostannite ion $(SnF_4)^{-2}$ or the fluostannate ion $(SnF_6)^{-2}$ does not pass through either membrane 180 or 182 and is returned to the plating bath. In addition, the three cell compartment prevents the tin from being oxidized as it is necessary to retain as much tin as possible in the stannous (fluostannite) condition. The process disclosed in FIG. 5 is similar in certain respects to the process disclosed in FIG. 1. In the process in FIG. 1, however, the tin is in the stannic (stannate) form and can be passed across the anode whereas in the process disclosed in FIG. 5 the tin is in the stannous condition and must be kept away from the anode.

The permselective membranes 180 and 182 are conventional cation permselective membranes and are similar to those illustrated in FIG. 1.

Although the specie illustrated in FIGS. 4 and 5 disclose a three compartment cell it should be understood that cells having a greater number of compartments may be employed as long as there is a "neutral" compartment between the anode and cathode compartments.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for controlling the concentration of alkali metal ions in an electrochemical tin-plating bath while plating tin on a metallic member comprising, a tin-plating tank adapted to contain a first liquid with said alkali metal ions, said tin-plating tank forming an anode compartment an anode positioned in said tin-plating tank adapted to be in contact with said first liquid, a cathode compartment in said tank including at least one cation permselective membrane, said cation permselective membrane positioned in said tin-plating tank, a cathode positioned in said cathode compartment and an anode positioned in said tin-plating tank, means to supply a second liquid to said cathode compartment, means to withdraw said second liquid from said cathode compartment, and said anode and cathode arranged to continuously remove a portion of said alkali metal ions from said first liquid and transfer said portion of said alkali metal ions through said cation permselective membrane into said second liquid while said metallic member is being plated with tin in said tin plating tank.

2. Apparatus for controlling the concentration of alkali metal ions in an electrochemical tin-plating bath while plating tin on a metallic member as set forth in claim 1 in which, said cathode compartment is formed by the side walls and bottom wall of said tin-plating tank and said cation permselective membrane.

3. Apparatus for controlling the concentration of alkali metal ions in an electrochemical tin-plating bath while plating tin on a metallic member as set forth in claim 1 in which, said cathode compartment has at least one wall formed of a cation permselective membrane, said cathode compartment positioned in said tin-plating tank.

4. Apparatus for controlling the concentration of alkali metal ions in an electrochemical tin-plating bath while plating tin on a metallic member as set forth in claim 1 in which, said cathode compartment includes a pair of generally rectangular cation permselective membranes positioned in spaced relation to each other, a generally U-shaped member positioned between said permselective membranes and forming said cathode compartment, and means to support said cathode compartment in said tin-plating tank.

5. Apparatus for continuously controlling the concentration of alkali metal ions in an electrochemical metal plating bath while plating a metal on a metallic member comprising, a metal plating tank adapted to contain a first liquid with said alkali metal ions therein for continuously electrochemically plating a metallic member, an anode positioned in said metal plating tank adapted to be in contact with said first liquid, a cathode compartment within said metal plating tank, a cation permselective membrane forming at least a portion of the closure forming said cathode compartment in said metal plating tank, said cation permselective membrane positioned within said metal plating tank, a cathode positioned in said cathode compartment, means to supply a second liquid to said cathode compartment, means to withdraw said second liquid from said cathode compartment, and said anode and cathode arranged to continuously remove a portion of said alkali metal ions from said first liquid and transfer said alkali metal ions through said cation permselective membrane to said second liquid while said metallic member is being plated in said metal plating bath.

6. Apparatus for continuously controlling the concentration of alkali metal ions in an electrochemical tin plating bath while plating tin on a metallic member comprising, a tin plating tank adapted to contain a first liquid with said alkali metal ions therein for continuously plating a metallic member with tin, said tin plating tank forming an anode compartment containing said first liquid with said alkali metal ions therein, an anode positioned in said tin plating tank adapted to be in contact with said first liquid, a cathode compartment within said tin plating tank, a cation permselective membrane forming at least a portion of the closure forming said cathode compartment in said tin plating tank, said cation permselective membrane positioned within said tin plating tank, a cathode positioned in said cathode compartment, means to supply a second liquid to said cathode compartment, means to withdraw said second liquid from said cathode compartment, and said anode and cathode arranged to continuously remove a portion of said alkali metal ions from said first liquid and transfer said alkali metal ions through said cation permselective membrane into said second liquid while said metallic member is being plated with tin in said tin plating bath.

* * * * *